US011205260B2

(12) United States Patent
Li et al.

(10) Patent No.: US 11,205,260 B2
(45) Date of Patent: Dec. 21, 2021

(54) GENERATING SYNTHETIC DEFECT IMAGES FOR NEW FEATURE COMBINATIONS

(71) Applicant: International Business Machines Corporation, Armonk, NY (US)

(72) Inventors: Jinfeng Li, Beijing (CN); Guo Qiang Hu, Shanghai (CN); Fan Li, Shanghai (CN); Wei Zhao, Shanghai (CN); Jian Xu, Shanghai (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 16/690,954

(22) Filed: Nov. 21, 2019

(65) Prior Publication Data

US 2021/0158503 A1 May 27, 2021

(51) Int. Cl.
*G06K 9/00* (2006.01)
*G06T 7/00* (2017.01)
*G06K 9/62* (2006.01)
*G06K 9/46* (2006.01)

(52) U.S. Cl.
CPC .......... *G06T 7/0004* (2013.01); *G06K 9/4609* (2013.01); *G06K 9/6256* (2013.01); *G06K 2209/19* (2013.01); *G06T 2207/20081* (2013.01)

(58) Field of Classification Search
CPC ............... G06K 9/4609; G06K 9/6256; G06K 2209/19; G06T 7/0004; G06T 2207/20081

See application file for complete search history.

(56) References Cited

U.S. PATENT DOCUMENTS

| 8,175,373 B2 | 5/2012 | Abbott et al. |
| 2015/0019014 A1 | 1/2015 | Kim |
| 2016/0163035 A1 | 6/2016 | Chang et al. |
| 2018/0060702 A1 | 3/2018 | Ma et al. |
| 2019/0073566 A1 | 3/2019 | Brauer |

(Continued)

FOREIGN PATENT DOCUMENTS

| CN | 101853522 A | 10/2010 |
| CN | 108846831 A | 11/2018 |

OTHER PUBLICATIONS

H. Zhang et al., "StackGAN: Text to Photo-Realistic Image Synthesis with Stacked Generative Adversarial Networks," 2017 IEEE International Conference on Computer Vision (ICCV), Venice, Italy, 2017, pp. 5908-5916, doi: 10.1109/ICCV.2017.629. (Year: 2017).*

(Continued)

*Primary Examiner* — Sean M Conner
(74) *Attorney, Agent, or Firm* — Patterson + Sheridan, LLP

(57) ABSTRACT

Aspects described herein include a computer-implemented method and associated system and computer program product. The method includes training a model using a plurality of defect images. Each defect image corresponds to a respective first feature combination of encoded textual features of a predefined set of textual features. The method further includes generating a first synthetic image using the model. The first synthetic image corresponds to a second feature combination of encoded textual features of the predefined set that is distinct from the first feature combinations.

18 Claims, 4 Drawing Sheets

(56) References Cited

U.S. PATENT DOCUMENTS

2020/0226420 A1* 7/2020 Shaubi .................... G06N 3/08

OTHER PUBLICATIONS

J. Wang, Z. Yang, J. Zhang, Q. Zhang and W. K. Chien, "AdaBalGAN: An Improved Generative Adversarial Network With Imbalanced Learning for Wafer Defective Pattern Recognition," in IEEE Transactions on Semiconductor Manufacturing, vol. 32, No. 3, pp. 310-319, Aug. 2019, doi: 10.1109/TSM.2019.2925361. (Year: 2019).*

T. Nakazawa and D. V. Kulkarni, "Wafer Map Defect Pattern Classification and Image Retrieval Using Convolutional Neural Network," in IEEE Transactions on Semiconductor Manufacturing, vol. 31, No. 2, pp. 309-314, May 2018, doi: 10.1109/TSM.2018.2795466. (Year: 2018).*

Li, W., Field, K.G. & Morgan, D. Automated defect analysis in electron microscopic images. npj Comput Mater 4, 36 (2018). https://doi.org/10.1038/s41524-018-0093-8 (Year: 2018).*

Xinyi Le, Junhui Mei, Haodong Zhang, Boyu Zhou, Juntong Xi, A learning-based approach for surface defect detection using small image datasets, Neurocomputing, vol. 408, 2020, pp. 112-120, ISSN 0925-2312, https://doi.org/10.1016/j.neucom.2019.09.107. (Year: 2020).*

K. Kyeong and H. Kim, "Classification of Mixed-Type Defect Patterns in Wafer Bin Maps Using Convolutional Neural Networks," in IEEE Transactions on Semiconductor Manufacturing, vol. 31, No. 3, pp. 395-402, Aug. 2018, doi: 10.1109/TSM.2018.2841416. (Year: 2018).*

Sharmistha Chatterjee, "Summarizing popular Text-to Image Synthesis methods with Python," [Acccessed Online Nov. 20, 2019] towardsdatascience.com.

Zhang et al., "StackGAN: Text to Photo-realistic Image Synthesis with Stacked Generative Adversarial Networks," 14 pages, arXiv:1612.03242v2 [cs.CV] Aug. 5, 2017.

Reed et al., "Generative Adversarial Text to Image Synthesis," 10 pages, arXiv:1605.05396v2 [cs.NE] Jun. 5, 2016.

* cited by examiner

GENERATING SYNTHETIC DEFECT IMAGES FOR NEW FEATURE COMBINATIONS

BACKGROUND

The present disclosure relates to defect inspection, and more specifically, to generating synthetic images for new feature combinations.

Defect inspection plays an important role in quality control processes used in manufacturing environments. Identifying different types of defects during defect inspection can be useful, for example, to pinpoint the source of the defect. In some cases, the different types of defects may be characterized by different combinations of defect features. However, models that are used to identify the different types of defects may not suitably achieve complete coverage, being based on a limited number of combinations of the defect features.

SUMMARY

According to one embodiment, a computer-implemented method comprises training a model using a plurality of defect images. Each defect image corresponds to a respective first feature combination of encoded textual features of a predefined set of textual features. The method further comprises generating a first synthetic image using the model. The first synthetic image corresponds to a second feature combination of encoded textual features of the predefined set that is distinct from the first feature combinations.

According to one embodiment, a system comprises a memory storing a plurality of defect images. Each defect image corresponds to a respective first feature combination of encoded textual features of a predefined set of textual features. The system further comprises one or more computer processors configured to train a model using the plurality of defect images, and generate a first synthetic image using the model. The first synthetic image corresponds to a second feature combination of encoded textual features of the predefined set that is distinct from the first feature combinations.

According to one embodiment, a computer program product for defection detection comprises a computer-readable storage medium having computer-readable program code embodied therewith. The computer-readable program code is executable by one or more computer processors to perform an operation comprising training a model using a plurality of defect images. Each defect image corresponds to a respective first feature combination of encoded textual features of a predefined set of textual features. The operation further comprises generating a first synthetic image using the model. The first synthetic image corresponds to a second feature combination of encoded textual features of the predefined set that is distinct from the first feature combinations.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of the disclosure and are therefore not to be considered limiting of its scope, for the disclosure may admit to other equally effective embodiments.

DETAILED DESCRIPTION

Figure 1:
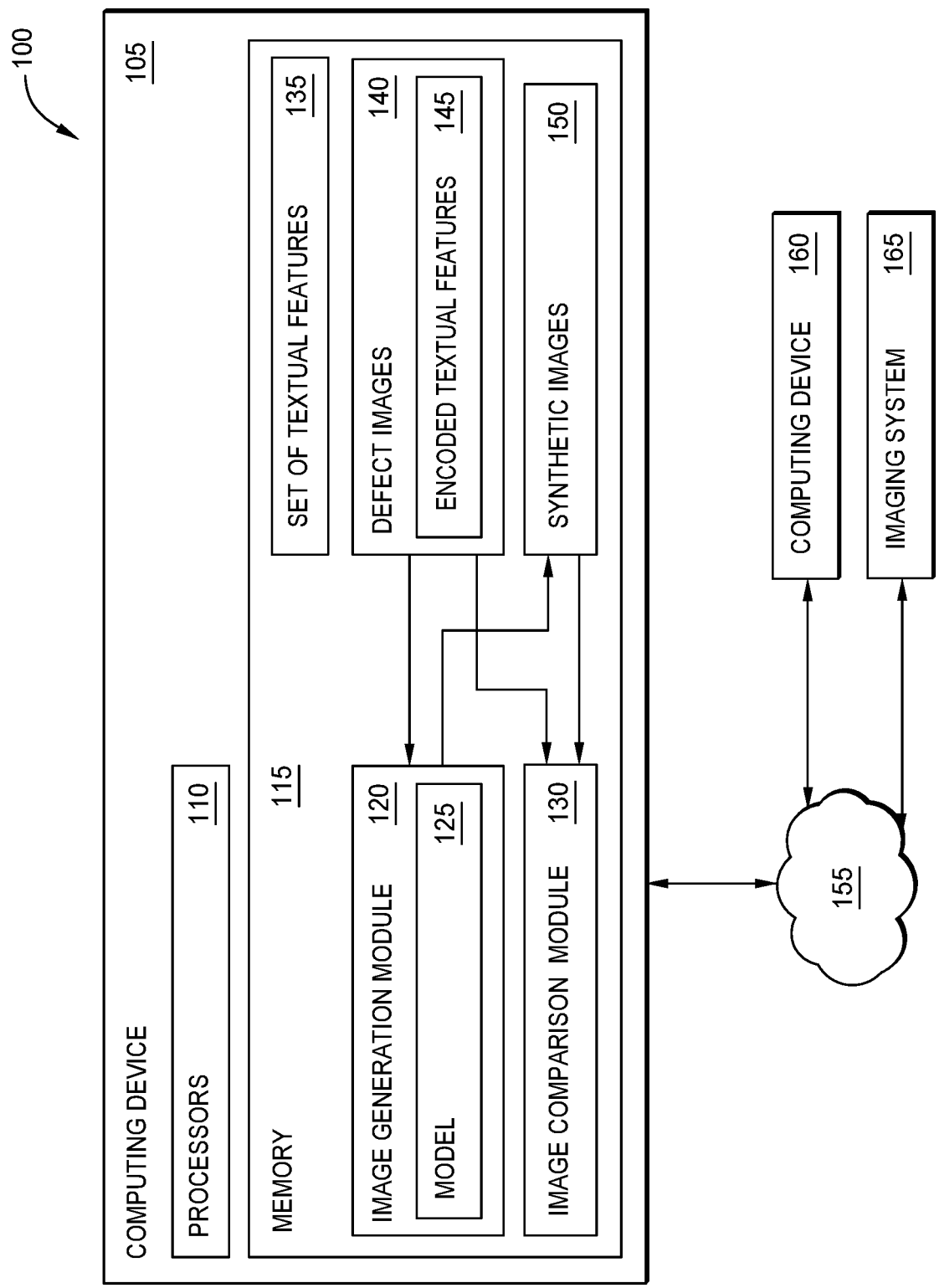
FIG. 1 is a block diagram of an exemplary system for defect inspection, according to one or more embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

According to embodiments described herein, a method of defect inspection comprises training a model using a plurality of defect images. Each defect image corresponds to a respective first feature combination of encoded textual features of a predefined set of textual features. The method further comprises generating a first synthetic image using the model. The first synthetic image corresponds to a second feature combination of encoded textual features of the predefined set that is distinct from the first feature combinations.

By generating the synthetic image(s), the defect inspection may be performed with enhanced coverage of the feature combinations of the predefined set of textual features. In some cases, the defect inspection may provide complete coverage of all of the possible feature combinations. In this way, the defect inspection may be made more robust despite having a limited set of training data available for training the model. Further, the synthetic image(s) may allow discovery of new defect types (e.g., feature combinations that were not previously encountered in the defect inspection) to be identified and suitably described.

In some embodiments, generating the first synthetic image comprises receiving a textual input describing the second feature combination, generating a temporary synthetic image using the textual input, and generating the first synthetic image using the textual input and the temporary synthetic image. In some embodiments, the model is a generative adversarial network (GAN) model, generating the temporary synthetic image is performed at a first stage of the GAN model, and generating the second synthetic image is performed at a second stage of the GAN model.

In some embodiments, the method further comprises receiving a test defect image and determining a third feature combination of the test defect image. Determining the third feature combination comprises comparing the test defect image with the plurality of synthetic images. In some embodiments, determining the third feature combination comprises determining which synthetic image of the plurality of synthetic images has a greatest similarity to the test defect image, and selecting the feature combination of the determined synthetic image as the third feature combination.

FIG. 1 is a block diagram of an exemplary system 100 for defect inspection, according to one or more embodiments. In some embodiments, the system 100 is used within a manufacturing environment for any suitable devices (e.g., semiconductor devices at chip and/or wafer level). However, the system 100 may be used within any alternate suitable environment. The system 100 comprises a computing device 105 communicatively coupled via a network 155 with a computing device 160 and with an imaging system 165.

The computing device 105 comprises one or more computer processors 110 (also referred to as "processors 110") and a memory 115. The one or more processors 110 may be implemented in any suitable form, such as a general purpose microprocessor, a controller, an application-specific integrated circuit (ASIC), and so forth. The memory 115 may include a variety of computer-readable media selected for their size, relative performance, or other capabilities: volatile and/or non-volatile media, removable and/or non-removable media, etc. Further, the one or more processors 110 and/or the memory 115 may be included in a single computing device, or may be distributed among multiple communicatively-coupled computing devices.

The memory 115 stores a predefined set of textual features 135 for describing various dimensions within the spectrum of detectable defects, such that each type of defect may be described by a combination of defect features of the set of textual features 135. In some embodiments, the set of textual features 135 comprises one or more categories of features. For example, the set of textual features 135 may comprise a first category of features describing a defect shape, and a second category of features describing a bounding shape for a group of the individual defects. Any other suitable textual features are also contemplated, such as defect size, defect density (e.g., a number of individual defects within a particular area), defect variance (e.g., differences in defect size), and so forth.

The memory 115 stores a plurality of defect images 140. Each defect image of the plurality of defect images 140 comprises one or more encoded textual features 145. The encoded textual features 145 may be encoded in each of the defect images 140 using any suitable techniques. Thus, each of the defect images 140 corresponds to a respective feature combination of the set of textual features 135.

In some embodiments, the plurality of defect images 140 is acquired using the imaging system 165. The imaging system 165 comprises one or more visual sensors of any suitable type. Some examples of the imaging system 165 comprise a brightfield optical inspection system, a darkfield optical inspection system, an e-beam inspection system, a scanning electron microscopy imaging system, an x-ray diffraction imaging (XRDI) system, and so forth.

The memory 115 may include one or more "modules" or "sub-modules" for performing various functions described herein. In one embodiment, each module or sub-module includes program code that is executable by the one or more processors 110. However, other embodiments may have functionality that is partially or fully implemented in hardware (i.e., circuitry) or firmware of the system 100. As shown, the system 100 comprises an image generation module 120 and an image comparison module 130, although other combinations of the described functionality are also contemplated.

The image generation module 120 generates one or more synthetic images 150 based on the plurality of defect images 140. In some embodiments, the image generation module 120 comprises a model 125, which is a text-to-image synthesis model trained using the plurality of defect images 140. In some embodiments, a portion of the plurality of defect images 140 comprises training data for the model 125, and another portion of the plurality of defect images 140 comprises test data used to test the model 125. In some cases, the test data comprises a "new" feature combination that is not reflected in the feature combinations represented in the training data.

In some embodiments, the model 125 comprises a generative adversarial network (GAN) model, although other suitable text-to-image synthesis models are also contemplated. Some non-limiting examples of the GAN model include text-conditional convolutional GAN, Multi-Scale Gradient GAN, StackGAN, StackGAN++, Object-driven Attentive GAN, MirrorGAN, Deep Convolutional GAN, and so forth. One example of a GAN model (more specifically, StackGAN) is described below with respect to FIG. 6.

The one or more synthetic images 150 represent different feature combinations of the set of textual features 135. In some embodiments, the one or more synthetic images 150 includes at least one synthetic image that corresponds to the "new" feature combination that was not previously encountered (e.g., not reflected in the plurality of defect images 140 that were used to train the model 125). In this way, the one or more synthetic images 150 may be used to enhance coverage of the feature combinations of the set of textual features 135, which supports a more robust defect inspection.

The image comparison module 130 compares the synthetic images 150 with the defect images 140 according to any suitable techniques. In some embodiments, the image comparison module 130 classifies, based on the comparison, the feature combination of a received defect image. For example, the defect image may be classified with the feature combination of the synthetic image that is closest to the defect image. In some embodiments, the image comparison module 130 outputs a textual representation of the feature combination. In this way, the cooperative operation of the image generation module 120 and the image comparison module 130 can support an increased ability to describe the defect to inspectors, as well as the ability to identify new defect types that were not previously reflected in the training data for the model 125.

Although the plurality of defect images 140, the synthetic images 150, the image generation module 120, and the image comparison module 130 are illustrated as being included in the memory 115 of the computing device 105, other implementations may include one or more of these in a computing device 160 that is external to the computing device 105. The computing device 160 may be similarly configured as the computing device 105 (e.g., comprising one or more computer processors, a memory, and input/output capabilities).

In one example, the computing device 160 may control operation of the imaging system 165 to acquire the plurality of defect images 140, and may store the plurality of defect images 140 locally in a non-volatile memory. During operation of the image generation module 120 and/or the image comparison module 130, the computing device 160 transmits the plurality of defect images 140 to the computing device 105, which may then be stored in a volatile portion of the memory 115 (e.g., random access memory (RAM)). In another example, the image generation module 120 and/or the image comparison module 130 are included in the computing device 160.

The network 155 may represent one or more networks of any suitable type(s) for communicatively coupling the computing device 105 with the computing device 160 and the imaging system 165. For example, the network 155 may comprise the Internet, a local area network (LAN), a wide area network (WAN), and/or a wireless network. The network 155 may comprise copper transmission cables, optical transmission fibers, wireless transmission, routers, firewalls, switches, gateway computers, and/or edge servers.

Figure 2:
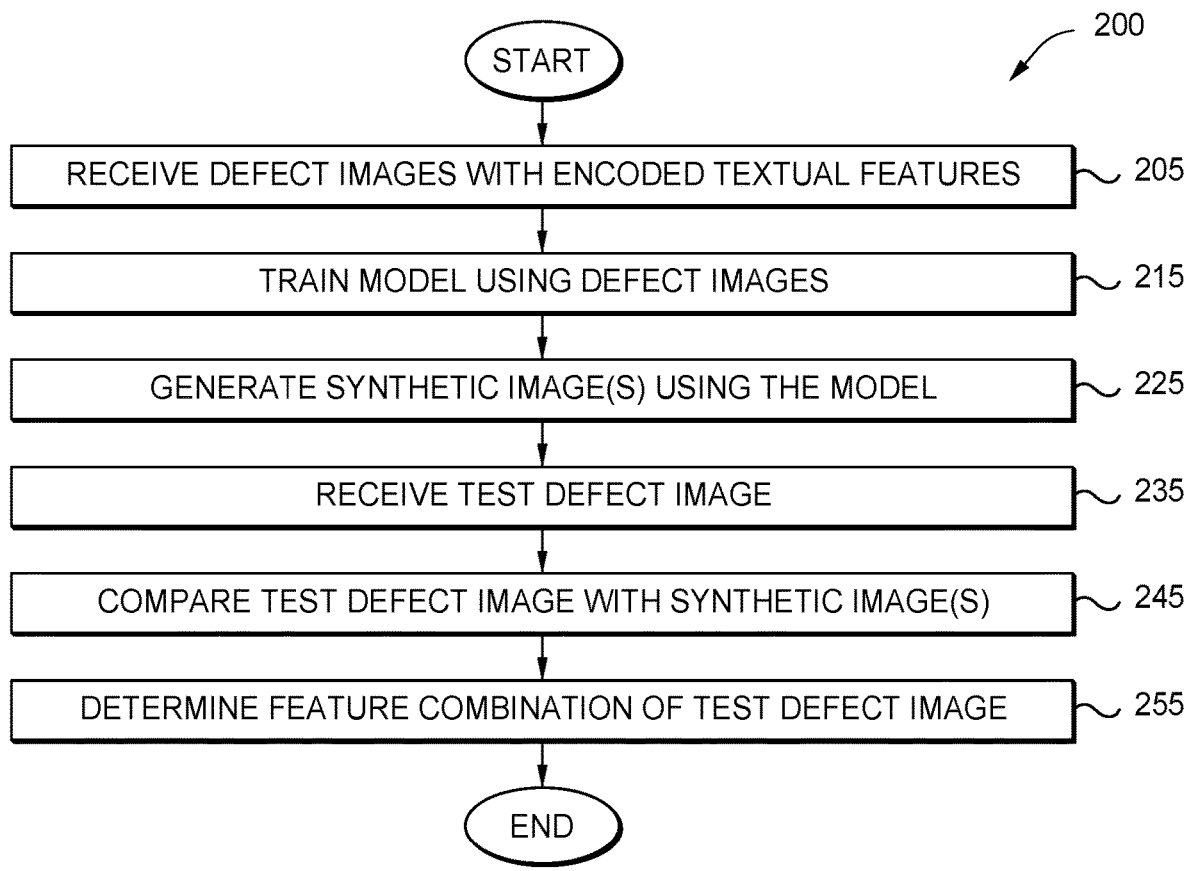
FIG. 2 is an exemplary method of defect inspection using synthetic images, according to one or more embodiments.

FIG. 2 is an exemplary method 200 of defect inspection using synthetic images, according to one or more embodiments. The method 200 may be used in conjunction with other embodiments, such as being performed by the cooperative operation of the image generation module 120 and the image comparison module 130 of FIG. 1.

The method 200 begins at block 205, where a computing device receives defect images with encoded textual features. The encoded textual features are included in a predefined set of textual features. At block 215, the computing device trains a model using the defect images. The model comprises a text-to-image synthesis model, such as a GAN model. At block 225, the image generation module generates one or more synthetic images using the model. In some embodiments, the one or more synthetic images include at least one synthetic image that corresponds to a "new" feature combination that was not previously encountered with the defect images.

At block 235, the computing device receives a test defect image. In some embodiments, the test defect image comprises a defect image from the received defect images that has been designated as test data. In other embodiments, the test defect image comprises a defect image acquired after the model has been fully trained and tested.

At block 245, the image comparison module compares the test defect image with the one or more synthetic images. The comparison may be performed according to any suitable techniques. For example, the discriminator function of any GAN model may be used to determine difference(s) between a test defect image and the one or more synthetic images.

At block 255, the image comparison module determines a feature combination of the test defect image. In some embodiments, the test defect image may be classified with the feature combination of the synthetic image that is closest to the test defect image. The image comparison module may display or otherwise output a textual representation of the feature combination. The method 200 ends following completion of block 255.

Figure 3:
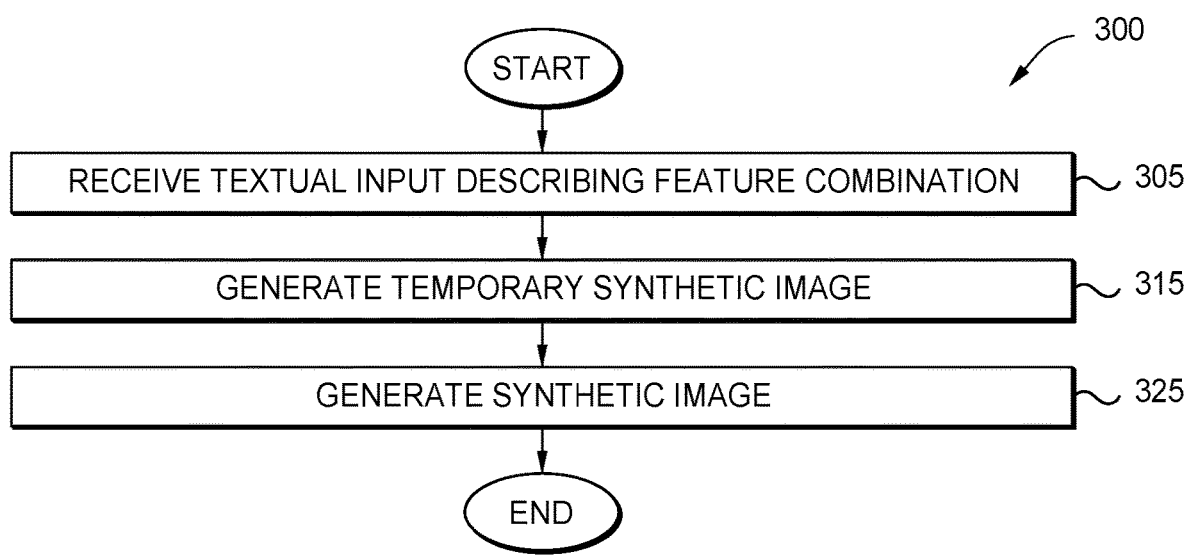
FIG. 3 is an exemplary method of generating a synthetic image for an input feature combination, according to one or more embodiments.

FIG. 3 is an exemplary method 300 of generating a synthetic image for an input feature combination, according to one or more embodiments. The method 300 may be used in conjunction with other embodiments, such as being performed as part of block 225 of FIG. 2.

The method 300 begins at block 305, where the model receives a textual input describing a feature combination. At block 315, the model generates a temporary synthetic image using the textual input. In some embodiments, the model comprises a GAN model, and generating the temporary synthetic image is performed at a first stage of the GAN model.

At block 325, the model generates the synthetic image using the textual input and the temporary synthetic image. The synthetic image may be generated with a greater resolution than the temporary synthetic image. In some embodiments, generating the synthetic image is performed at a second stage of the GAN model. The method 300 ends following completion of the block 325.

Figure 4:
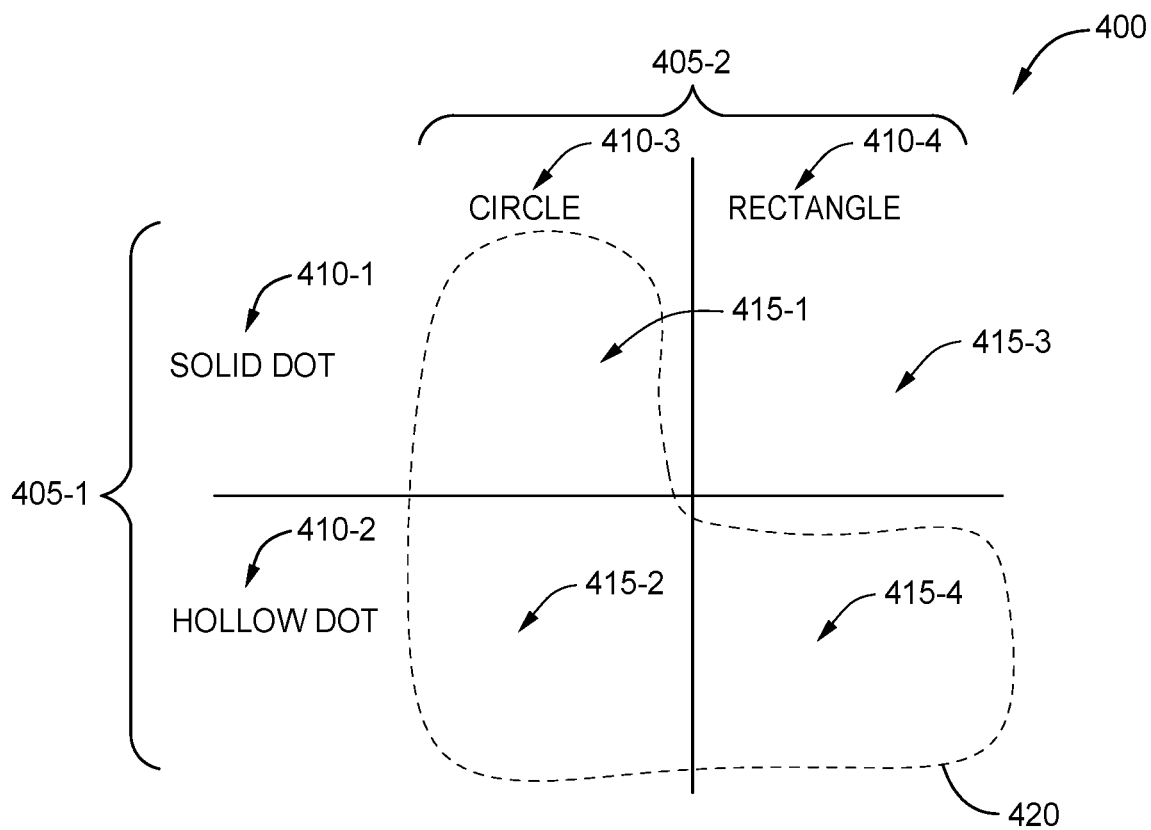
FIG. 4 is a diagram illustrating exemplary training data coverage, according to one or more embodiments.

FIG. 4 is a diagram 400 illustrating exemplary training data coverage, according to one or more embodiments. The features illustrated in the diagram 400 may be used in conjunction with other embodiments. The diagram 400 includes a 2×2 matrix, with two features depicted along each axis. The 2×2 matrix is provided as one simplified example, and the principles may be applied to other numbers of features.

The diagram 400 includes a first category 405-1 of features describing a defect shape of individual defects. As shown, the first category 405-1 includes features 410-1 (solid dot) and 410-2 (hollow dot). The diagram 400 further includes a second category 405-2 of features describing a bounding shape for a group of the individual defects. As shown, the second category 405-2 includes features 410-3 (circle) and 410-4 (rectangle).

Thus, the diagram 400 depicts four (4) possible feature combinations 415-1, 415-2, 415-3, 415-4 corresponding to the features 410-1, 410-2, 410-3, 410-4. However, the defect images used for training the model (training data) has limited or incomplete coverage 420 corresponding to the feature combinations 415-1, 415-2, 415-4. Stated another way, the feature combination 415-3 (reflecting a solid dot defect shape with a rectangle bounding shape) is not represented in the coverage 420 of the training data.

Figure 5:
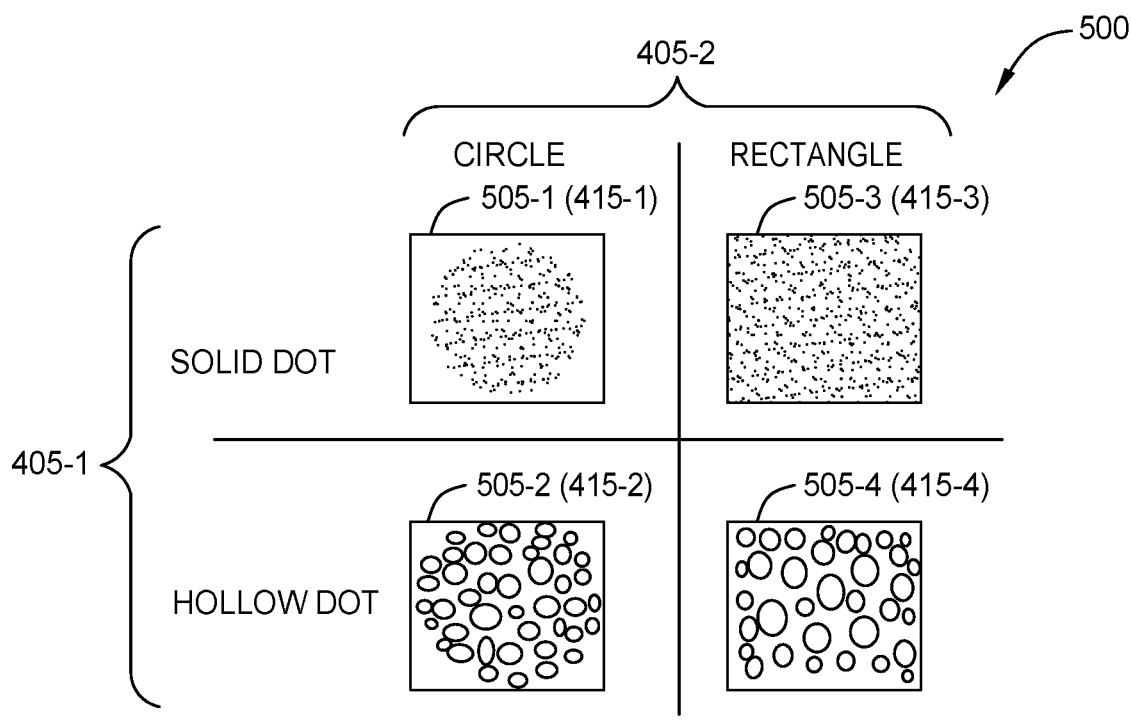
FIG. 5 is a diagram illustrating synthetic images generated for all possible feature combinations, according to one or more embodiments.

Now referring to FIG. 5, diagram 500 illustrates synthetic images generated for each of the feature combinations 415-1, 415-2, 415-3, 415-4. More specifically, the image generation module 120 of FIG. 1 may generate synthetic images 505-1 (corresponding to the feature combination 415-1), 505-2 (corresponding to the feature combination 415-2), 505-3 (corresponding to the feature combination 415-3), 505-4 (corresponding to the feature combination 415-4) despite the incomplete coverage 420 of the training data. In this way, the image generation module 120 may expand or complete the coverage 420 to cover additional feature combinations.

Figure 6:
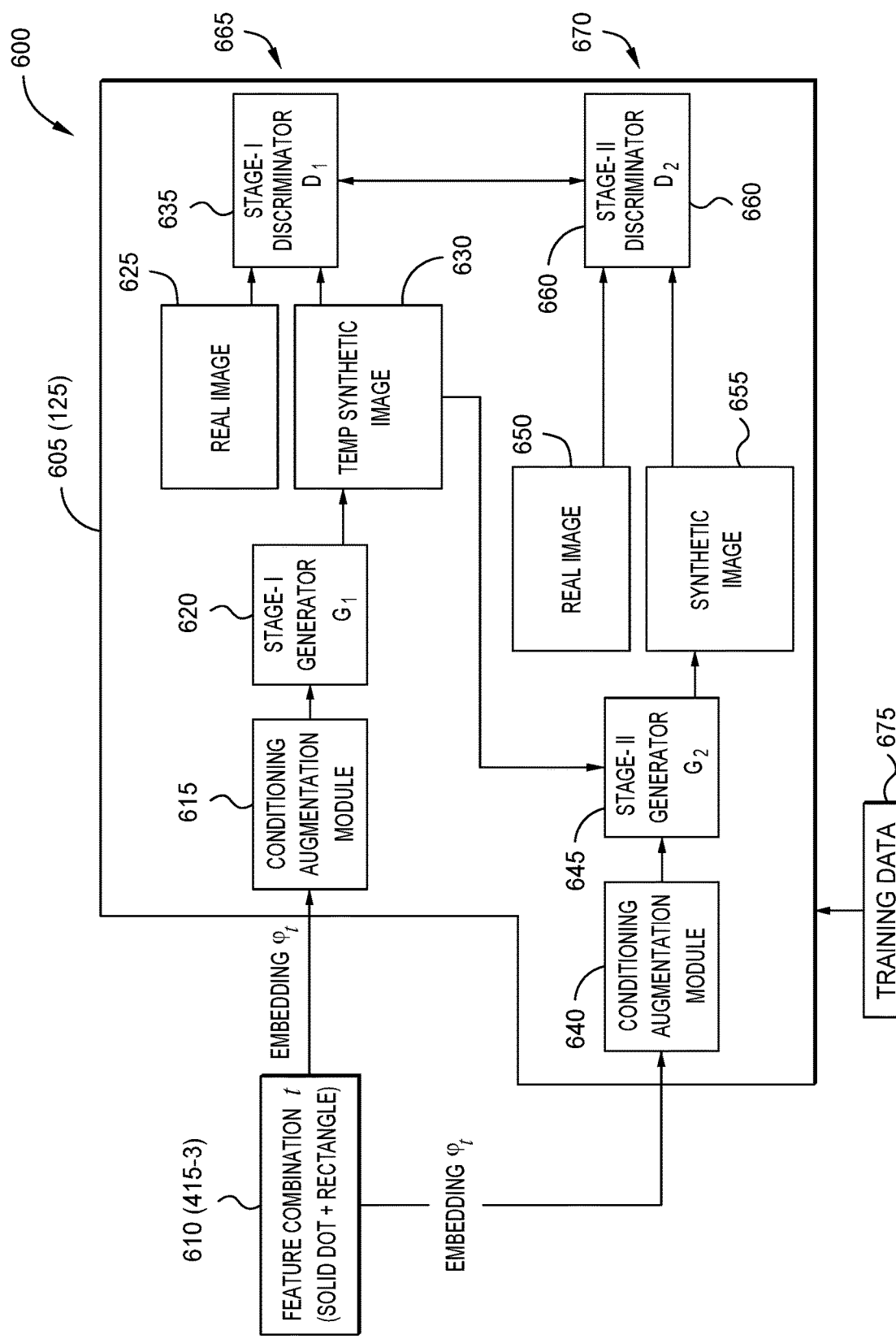
FIG. 6 is a block diagram illustrating an exemplary generative adversarial network (GAN) model, according to one or more embodiments.

FIG. 6 is a block diagram 600 illustrating an exemplary generative adversarial network (GAN) model 605, according to one or more embodiments. The features illustrated in the block diagram 600 may be used in conjunction with other embodiments. For example, the GAN model 605 represents one example of the model 125 of FIG. 1, and may be used to generate synthetic images such as the synthetic images 505-1, 505-2, 505-3, 505-4 depicted in FIG. 5. While the GAN model 605 is shown as a StackGAN model, other types of GAN models are also contemplated.

The GAN model 605 performs a text-to-image generation process in two stages. The GAN model 605 comprises a first stage 665 that produces a low-resolution image (a temporary synthetic image 630) using a textual input 610, and a second stage 670 that produces a higher-resolution image (a synthetic image 655) using the textual input 610 and the temporary synthetic image 630.

The GAN model 605 is trained using training data 675 comprising defect images. Applying the example of FIG. 4, the defect images included in the training data 675 may reflect the feature combinations 415-1, 415-2, 415-4, and does not reflect the feature combination 415-3 (a solid dot defect shape with a rectangle bounding shape). The GAN model 605 receives a textual input 610 describing the feature combination 415-3. The textual input 610 is encoded as latent variables in text embedding $\varphi_t$. A conditioning augmentation module 615 receives the text embedding $\varphi_t$ and generates a text conditioning variable. In some embodiments, the text embedding $\varphi_t$ is provided into a fully-connected layer to generate parameters for a Gaussian distribution, from which the text conditioning variable may be sampled.

A Stage-I generator 620 receives the text conditioning variable from the conditioning augmentation module 615 and concatenates the text conditioning variable with a noise vector. The Stage-I generator 620 upsamples the concatenated results to generate the temporary synthetic image 630. Generally, the temporary synthetic image 630 includes the primitive shape and basic colors of the object based on the textual input 610, and the background layout is generated from the noise vector.

The first stage 665 further comprises a Stage-I discriminator 635 that distinguishes the temporary synthetic image 630 from one or more real images 625. The one or more real images 625 may be selected directly from the training data 675. In some embodiments, the Stage-I discriminator 635 compresses the dimensionality of the text embedding $\varphi_t$ using a fully-connected layer, and spatially replicates the compressed text embedding to form a tensor with a desired dimensionality. The temporary synthetic image 630 is downsampled to match the dimensionality of the tensor, and the image filter map is concatenated along the channel dimension with the text tensor. The resulting tensor is fed into a 1×1 convolutional layer to jointly learn features across the temporary synthetic image 630 and the text embedding $\varphi_t$. A fully-connected layer of the Stage-I discriminator 635 is used to generate the decision score.

A conditioning augmentation module 640 of the second stage 670 receives the text embedding $\varphi_t$ and generates a text conditioning variable. In some embodiments, the text embedding $\varphi_t$ is provided into a fully-connected layer to generate parameters for a Gaussian distribution (e.g., mean and standard deviation), from which the text conditioning variable may be sampled. Generally, the fully-connected layer of the conditioning augmentation module 640 differs from the fully-connected layer of the conditioning augmentation module 615, which allows the conditioning augmentation module 640 to capture useful information that may have been overlooked by the Stage-I generator 620.

A Stage-II generator 645 receives the text conditioning variable from the conditioning augmentation module 640, and spatially replicates the text conditioning variable to form a tensor with a desired dimensionality. The Stage-II generator 645 also receives the temporary synthetic image 630, and downsamples the temporary synthetic image 630 to match the dimensionality of the tensor.

The features of the text conditioning variable and the temporary synthetic image 630 are concatenated along the channel dimension, and provided into several residual blocks that learn multi-modal representations across the image and text features. The Stage-II generator 645 upsamples the output of the residual blocks to generate the synthetic image 655. In some embodiments, the synthetic image 655 has a greater resolution than that of the temporary synthetic image 630. The synthetic image 655 tends to include greater detail and/or mitigate defects in the temporary synthetic image 630.

The second stage 670 further comprises a Stage-II discriminator 660 that compresses the dimensionality of the text embedding $\varphi_t$ using a fully-connected layer, and spatially replicates the compressed text embedding to form a tensor with a desired dimensionality. The Stage-II discriminator 660 may be structurally similar to the Stage-I discriminator 635, receiving the synthetic image 655 and one or more real images 650 selected from the training data 675. Owing to the greater resolution of the synthetic image 655, the Stage-II discriminator 660 generally includes more downsampling blocks than the Stage-I discriminator 635. In some cases, the Stage-I discriminator 635 and/or the Stage-II discriminator 660 comprise a matching-aware discriminator such as the GAN-conditional latent space (GAN-CLS) algorithm. During training, the matching-aware discriminator takes real images and corresponding text descriptions as positive sample pairs, whereas negative sample pairs include two groups: real images with mismatched text embeddings, and synthetic images with corresponding text embeddings. A fully-connected layer of the Stage-II discriminator 660 is used to generate the decision score.

In some embodiments, the image comparison module 130 of FIG. 1 classifies the feature combination of a received defect image according to:

Feature Combination of Generated Images $[i]$=arg-Max$_i$ Similarity (RealImage, Generated Images $[i]$), such that the defect image may be classified with the feature combination of the synthetic image that is closest to the defect image. In some embodiments, the image comparison module 130 includes the Stage-II discriminator 660, and the Stage-II discriminator 660 implements the classification function according to:

Value (Real Image), Value (Generated Image $[i]$) =Stage-II Discriminator (Real Image, Generated Image $[i]$), where Value (Real Image)+Value (Generated Image $[i]$)=1. The Stage-II discriminator 660 further implements the classification function according to:

$$\text{Similarity} = \frac{1}{|\text{Value (Real Image)} - \text{Value (Generated image}[i])|},$$

although other suitable techniques for performing the classification are also contemplated.

Thus, using the synthetic image(s), the defect inspection may be performed with enhanced coverage of the feature combinations of the predefined set of textual features. In this way, the defect inspection may be made more robust despite having a limited set of training data available for training the model. Further, the synthetic image(s) may allow discovery of new defect types (e.g., feature combinations that were not previously encountered in the defect inspection) to be identified and suitably described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
    training a model using a plurality of defect images, wherein each defect image includes a respective first combination of defect features that are also represented as a respective first plurality of encoded textual features selected from a predefined set of textual features, wherein the respective first plurality of encoded textual features comprises:
        a first feature describing a defect shape of individual defects; and
        a second feature describing a bounding shape for a group of the individual defects; and
    generating a first synthetic image using the model, wherein the first synthetic image corresponds to a second combination of defect features that are also represented as a second plurality of encoded textual features of the predefined set, wherein the second plurality of encoded textual features is distinct from the respective first pluralities of encoded textual features,
    wherein the predefined set of textual features from which the respective first features of the respective first plurality of encoded textual features are selected comprises solid dot and hollow dot, and
    wherein the predefined set of textual features from which the respective second features of the respective first plurality of encoded textual features are selected comprises circle and rectangle.

2. The method of claim 1, further comprising:
    generating a plurality of synthetic images using the model, wherein the plurality of synthetic images comprises:
        the first synthetic image; and
        a second synthetic image that corresponds to one of the respective first combinations of defect features.

3. The method of claim 2, further comprising:
    receiving a test defect image; and
    determining a third combination of defect features of the test defect image, wherein determining the third combination of defect features comprises comparing the test defect image with the plurality of synthetic images.

4. The method of claim 3, wherein determining the third combination of defect features comprises:
    determining which synthetic image of the plurality of synthetic images has a greatest similarity to the test defect image; and
    selecting the combination of defect features of the determined synthetic image as the third combination of defect features.

5. The method of claim 1, wherein generating the first synthetic image comprises:
    receiving, at the model, a textual input describing the second combination of defect features;
    generating a temporary synthetic image using the textual input; and
    generating the first synthetic image using the textual input and the temporary synthetic image.

6. The method of claim 5,
    wherein the model comprises a generative adversarial network (GAN) model,
    wherein generating the temporary synthetic image is performed at a first stage of the GAN model, and
    wherein generating the first synthetic image is performed at a second stage of the GAN model.

7. A system comprising:
    a memory storing a plurality of defect images, wherein each defect image includes a respective first combination of defect features that are also represented as a respective first plurality of encoded textual features selected from a predefined set of textual features, wherein the respective first plurality of encoded textual features comprises:
        a first feature describing a defect shape of individual defects; and
        a second feature describing a bounding shape for a group of the individual defects; and
    one or more computer processors configured to:
    train a model using the plurality of defect images; and
    generate a first synthetic image using the model, wherein the first synthetic image corresponds to a second combination of defect features that are also represented as a second plurality of encoded textual features of the predefined set, wherein the second plurality of encoded textual features is distinct from the respective first pluralities of encoded textual features,
    wherein the predefined set of textual features from which the respective first features of the respective first plurality of encoded textual features are selected comprises solid dot and hollow dot, and
    wherein the predefined set of textual features from which the respective second features of the respective first plurality of encoded textual features are selected comprises circle and rectangle.

8. The system of claim 7, wherein the one or more computer processors are further configured to:
    generate a plurality of synthetic images using the model, wherein the plurality of synthetic images comprises:
        the first synthetic image; and
        a second synthetic image that corresponds to one of the respective first combinations of defect features.

9. The system of claim 8, wherein the one or more computer processors are further configured to:
    receive a test defect image; and
    determine a third combination of defect features of the test defect image, wherein determining the third combination of defect features comprises comparing the test defect image with the plurality of synthetic images.

10. The system of claim 9, wherein determining the third combination of defect features comprises:
    determining which synthetic image of the plurality of synthetic images has a greatest similarity to the test defect image; and
    selecting the combination of defect features of the determined synthetic image as the third combination of defect features.

11. The system of claim 7, wherein generating the first synthetic image comprises:
    receiving, at the model, a textual input describing the second combination of defect features;
    generating a temporary synthetic image using the textual input; and
    generating the first synthetic image using the textual input and the temporary synthetic image.

12. The system of claim 11,
wherein the model comprises a generative adversarial network (GAN) model,
wherein generating the temporary synthetic image is performed at a first stage of the GAN model, and
wherein generating the first synthetic image is performed at a second stage of the GAN model.

13. A computer program product for defection detection, the computer program product comprising:
a computer-readable storage medium having computer-readable program code embodied therewith, the computer-readable program code executable by one or more computer processors to perform an operation comprising:
training a model using a plurality of defect images, wherein each defect image includes a respective first combination of defect features that are also represented as a respective first plurality of encoded textual features selected from a predefined set of textual features, wherein the respective first plurality of encoded textual features comprises:
a first feature describing a defect shape of individual defects; and
a second feature describing a bounding shape for a group of the individual defects; and
generating a first synthetic image using the model, wherein the first synthetic image corresponds to a second combination of defect features that are also represented as a second plurality of encoded textual features of the predefined set, wherein the second plurality of encoded textual features is distinct from the respective first pluralities of encoded textual features,
wherein the predefined set of textual features from which the respective first features of the respective first plurality of encoded textual features are selected comprises solid dot and hollow dot, and
wherein the predefined set of textual features from which the respective second features of the respective first plurality of encoded textual features are selected comprises circle and rectangle.

14. The computer program product of claim 13, the operation further comprising:
generating a plurality of synthetic images using the model, wherein the plurality of synthetic images comprises:
the first synthetic image; and
a second synthetic image that corresponds to one of the respective first combinations of defect features.

15. The computer program product of claim 14, the operation further comprising:
receiving a test defect image; and
determining a third combination of defect features of the test defect image, wherein determining the third combination of defect features comprises comparing the test defect image with the plurality of synthetic images.

16. The computer program product of claim 15, wherein determining the third combination of defect features comprises:
determining which synthetic image of the plurality of synthetic images has a greatest similarity to the test defect image; and
selecting the combination of defect features of the determined synthetic image as the third combination of defect features.

17. The computer program product of claim 13, wherein generating the first synthetic image comprises:
receiving, at the model, a textual input describing the second combination of defect features;
generating a temporary synthetic image using the textual input; and
generating the first synthetic image using the textual input and the temporary synthetic image.

18. The method of claim 17,
wherein the model comprises a generative adversarial network (GAN) model,
wherein generating the temporary synthetic image is performed at a first stage of the GAN model, and
wherein generating the first synthetic image is performed at a second stage of the GAN model.

* * * * *